No. 889,598. PATENTED JUNE 2, 1908.
L. D. GOFF & H. O. SPADE.
SCALE OR METER.
APPLICATION FILED MAY 11, 1907.

Witnesses
Lulu Greenfield
Gertrude Tallman

Inventors
Leo D. Goff
and Herbert O. Spade
By Chappell & Earl
Attorneys

UNITED STATES PATENT OFFICE.

LEO D. GOFF AND HERBERT O. SPADE, OF VICKSBURG, MICHIGAN.

SCALE OR METER.

No. 889,598.  Specification of Letters Patent.  Patented June 2, 1908.

Application filed May 11, 1907. Serial No. 373,174.

*To all whom it may concern:*

Be it known that we, LEO D. GOFF and HERBERT O. SPADE, citizens of the United States, residing at the village of Vicksburg, county of Kalamazoo, State of Michigan, have invented certain new and useful Improvements in Scales or Meters, of which the following is a specification.

This invention relates to improvements in scales or meters.

Our improved scale or meter is particularly designed by us for use in weighing or metering liquids, although it may by a slight modification be adapted for use in weighing such materials as grain or the like.

The main objects of this invention are, First. To provide an improved scale or meter which is accurate and at the same time one which is very simple and economical in structure. Second. To provide an improved meter or scale in which the bearing parts may be of comparatively large dimensions so that the structure is very durable.

Further objects, and objects relating to structural details, will definitely appear from the detailed description to follow.

We accomplish the objects of our invention by the devices and means described in the following specification.

The invention is clearly defined and pointed out in the claims.

Figure 1:
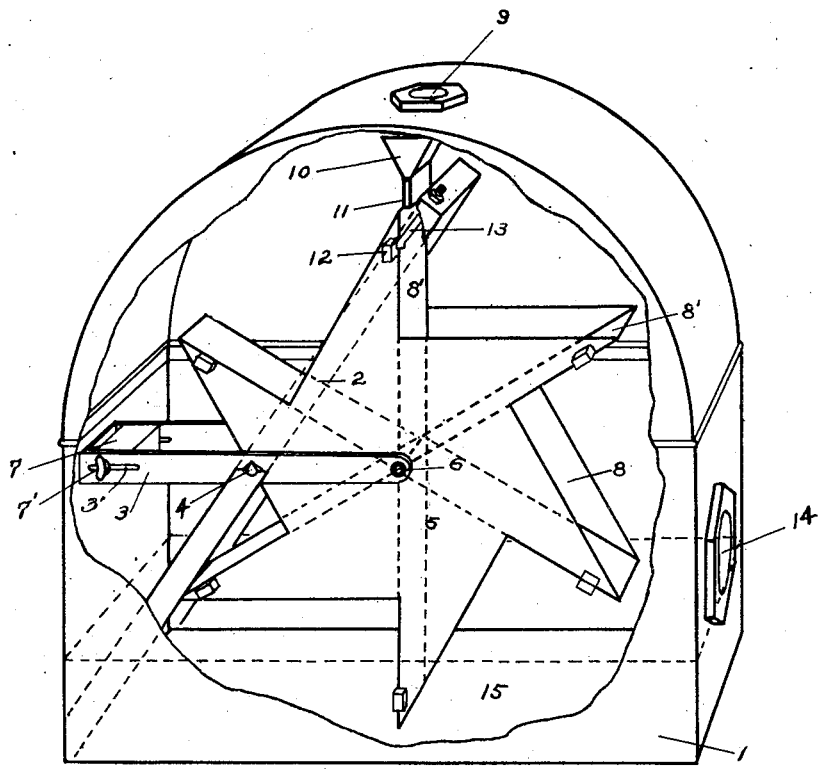
Figure 2:
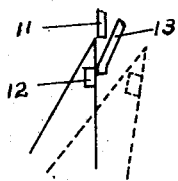
Figure 3:
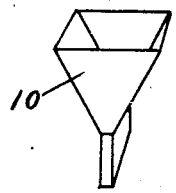
Figure 4:
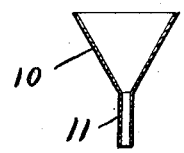

A structure embodying the features of our invention is clearly illustrated in the accompanying drawing, forming a part of this specification, in which, Figure 1 is a perspective view of our improved meter, portions of the casing and frame being broken away to show the arrangement of the parts. Fig. 2 is a detail diagrammatic view showing the movement of the weighing receptacle, whereby the tripping is accomplished. Fig. 3 is an enlarged perspective of the inlet or supply spout removed from the casing. Fig. 4 is a vertical section therethrough.

In the drawing similar letters of reference refer to similar parts throughout the several views.

Referring to the drawing, the casing 1 is preferably formed of sheet metal and is adapted to entirely inclose the measuring apparatus. Within the casing is a pair of standards 2 on which the scale beam 3 is pivoted, as at 4. This scale beam is preferably yoke-like in form to embrace the weighing receptacle 5, which is revolubly mounted thereon by means of the journal 6.

The weight 7 is adjustably arranged between the arms of the scale beams, being preferably supported by means of thumb screws 7' arranged in the longitudinal slots 3' in the scale beam. By this arrangement the parts can be accurately balanced.

The receptacle is provided with a plurality of compartments 8 separated by partitions 8' arranged radially relative to the journal of the receptacle. The casing is provided with an opening 9 at the top adapted to receive the supply pipe which delivers into a delivery spout 10. This spout is preferably provided with a flat delivery nozzle having a slot-like discharge opening. The delivery nozzle of the spout is preferably shaped to deliver against the rearward walls of the receptacles as they are in their receiving position. See Fig. 1. This prevents the force of the incoming fluid from acting on the scale.

On the standards 2 we arrange a fixed stop 13 which is adapted to engage the stops 12 on the receptacle. These stops are arranged to engage the fixed stops successively and hold the parts in proper position to receive the liquid from the spout. As soon as the weight of the liquid is sufficient to actuate the scale beam the stops are disengaged, allowing the receptacle to turn on its journal, the next succeeding stop on the receptacle engaging the fixed stop when the operation is repeated. A further advantage of the slot-like delivery opening of the supply pipe is that as soon as the scale beam is actuated the liquid is delivered into the succeeding receptacle thereby securing greater accuracy in the weighing.

The lower part of the receptacle casing is preferably adapted to serve as a liquid reservoir, so that the compartments of the receptacle passing into the same serves to check the movement of the receptacle, or acts as a brake therefor, which is of considerable advantage.

14 indicates the discharge openings to which a suitable spout or pipe may be connected as desired.

The registering mechanism may be connected to be actuated from the scale beam or other movable part, but as that forms no part of this present invention, we do not show or describe the same herein.

In Fig. 2 we illustrate diagrammatically the movement of the receptacle, whereby the stops are automatically disengaged.

Our improved metering or measuring device is very simple and economical in structure and at the same time accurate and very durable in use. We have described the same in the form preferred by us on account of structural simplicity and economy. We are, however, aware that it is capable of considerable variation in structural details without departing from our invention, and we desire to be understood as claiming the same specifically as illustrated, as well as broadly.

Having thus described our invention, what we claim as new and desire to secure by Letters Patent, is:

1. The combination of a casing, the lower portion of which is adapted to serve as a liquid reservoir; a pivoted scale beam; a receptacle revolubly mounted on said scale beam, said receptacle being provided with a plurality of triangular compartments separated by radially arranged partition walls; a fixed stop; a plurality of stops on said receptacle adapted to successively engage said fixed stop as the receptacle revolves, said stops being adapted to disengage to permit the turning of the receptacle on its pivot when the weight of the liquid actuates the scale beam; and a supply spout having a slot-like delivery opening adapted to discharge against the rearward walls of the receptacle compartments when the compartments are in their receiving position, the lower end of said receptacle extending into the reservoir in the bottom of the said chamber, whereby its movement is retarded, for the purpose specified.

2. The combination of a casing, the lower portion of which is adapted to serve as a liquid reservoir; a pivoted scale beam; a receptacle revolubly mounted on said scale beam, said receptacle being provided with a plurality of triangular compartments separated by radially arranged partition walls; a fixed stop; a plurality of stops on said receptacle adapted to successively engage said fixed stop as the receptacle revolves, said stops being adapted to disengage to permit the turning of the receptacle on its pivot when the weight of the liquid actuates the scale beam; and a supply spout, the lower end of said receptacle extending into the reservoir in the bottom of said chamber, whereby its movement is retarded, for the purpose specified.

3. The combination of a pivoted scale beam; a receptacle revolubly mounted on said scale beam, said receptacle being provided with a plurality of triangular compartments separated by radially arranged partition walls; a fixed stop; a plurality of stops on said receptacle adapted to successively engage said fixed stop as the receptacle revolves, said stops being adapted to disengage to permit the turning of the receptacle on its pivot when the weight of the material actuates the scale beam; and a supply spout having a slot-like delivery opening adapted to discharge against the rearward walls of the receptacle compartments when the compartments are in their receiving position, for the purpose specified.

4. The combination of a pivoted scale beam; a receptacle revolubly mounted on said scale beam, said receptacle being provided with a plurality of triangular compartments separated by radially arranged partition walls; a fixed stop; a plurality of stops on said receptacle adapted to successively engage said fixed stop as the receptacle revolves, arranged so that the rearward walls of the compartments are in substantially vertical positions when the compartments are in their receiving positions, the said stops being adapted to disengage to permit the turning of the receptacle on its pivot when the weight of the material actuates the scale beam; and a supply spout, for the purpose specified.

5. The combination of a casing, the lower portion of which is adapted to serve as a liquid reservoir; a pivoted scale beam; a receptacle revolubly mounted on said scale beam, said receptacle being provided with a plurality of compartments; a fixed stop; a plurality of stops on said receptacle adapted to successively engage said fixed stop as the receptacle revolves, said stops being adapted to disengage to permit the turning of the receptacle on its pivot when the weight of the liquid actuates the scale beam; and a supply spout adapted to discharge against the rearward walls of the receptacle compartments when the compartments are in their receiving position, the lower end of said receptacle extending into the reservoir in the bottom of the said chamber, whereby its movement is retarded, for the purpose specified.

6. The combination of a casing, the lower portion of which is adapted to serve as a liquid reservoir; a pivoted scale beam; a receptacle revolubly mounted on said scale beam, said receptacle being provided with a plurality of compartments; a fixed stop; a plurality of stops on said receptacle adapted to successively engage said fixed stop as the receptacle revolves, said stops being adapted to disengage to permit the turning of the receptacle on its pivot when the weight of the liquid actuates the scale beam; and a supply spout, the lower end of said receptacle extending into the reservoir in the bottom of the said chamber, whereby its movement is retarded, for the purpose specified.

7. The combination of a pivoted scale beam; a receptacle revolubly mounted on said scale beam, said receptacle being provided with a plurality of compartments; a fixed stop; a plurality of stops on said receptacle adapted to successively engage said fixed stop as the receptacle revolves, said stops being adapted to disengage to permit the turning of the receptacle on its pivot when the weight of the material actuates the scale beam; and a supply spout adapted to discharge against the rearward walls of the receptacle compartments when the compartments are in their receiving position, for the purpose specified.

8. The combination of a pivoted scale beam; a receptacle revolubly mounted on said scale beam, said receptacle being provided with a plurality of compartments; a fixed stop; a plurality of stops on said receptacle adapted to successively engage said fixed stop as the receptacle revolves, arranged so that the rearward walls of the compartments are in substantially vertical positions when the compartments are in their receiving positions, the said stops being adapted to disengage to permit the turning of the receptacle on its pivot when the weight of the material actuates the scale beam; and a supply spout, for the purpose specified.

In witness whereof, we have hereunto set our hands and seals in the presence of two witnesses.

LEO D. GOFF. [L. S.]
HERBERT O. SPADE. [L. S.]

Witnesses:
CHAS. H. LEGINGER,
TYRRELL RAYNER.